Nov. 27, 1951  H. R. BIANCO ET AL  2,576,514
PYROMETER
Filed June 11, 1949
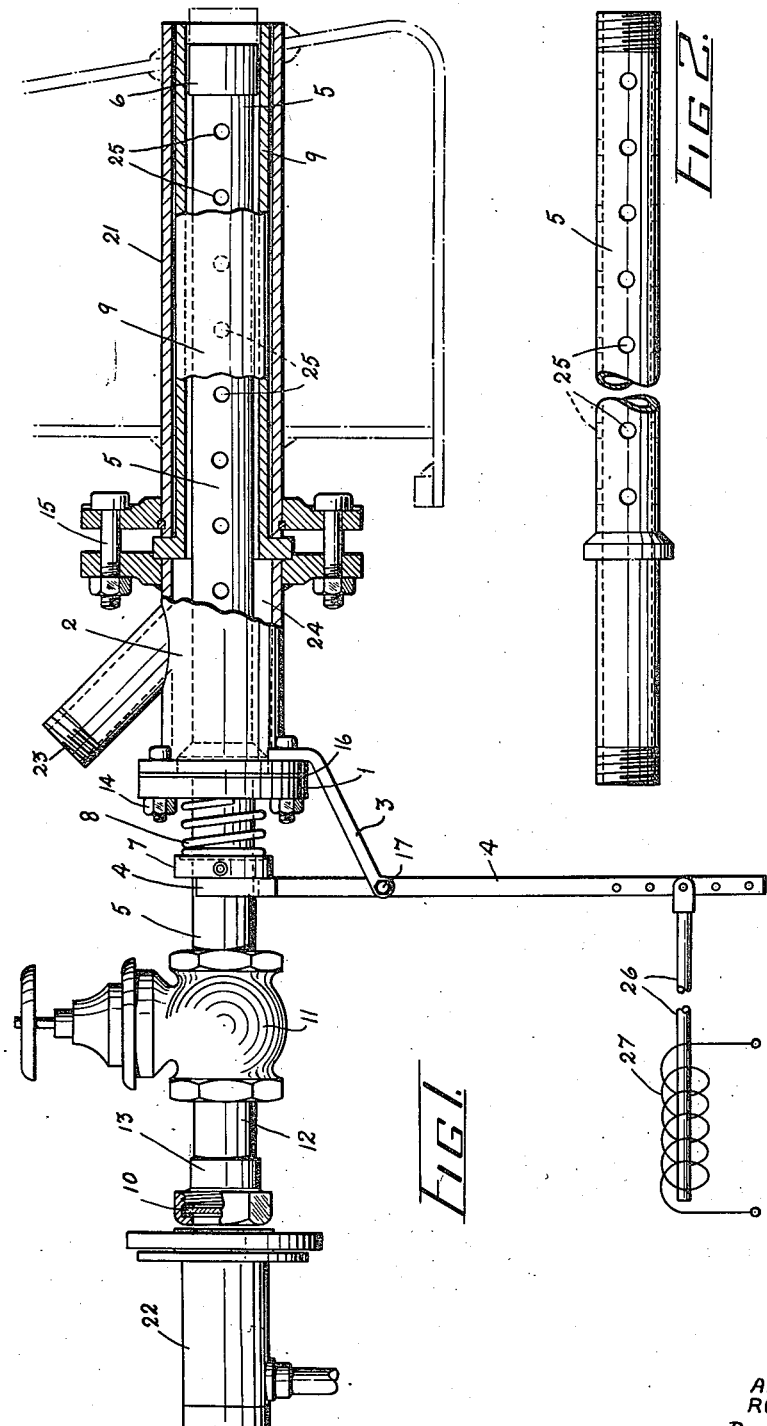
INVENTORS
HENRY R. BIANCO
ARTHUR H. W. BUSBY
RONALD A. GILES
By
*Harold Hughes*
ATTORNEY.

Patented Nov. 27, 1951

2,576,514

UNITED STATES PATENT OFFICE 2,576,514

PYROMETER

Henry Robert Bianco, Herculaneum, Mo., and Arthur H. Wilson Busby and Ronald A. Giles, Trail, British Columbia, Canada, assignors to The Consolidated Mining and Smelting Company of Canada, Limited, Montreal, Quebec, Canada, a corporation of the Dominion of Canada Application June 11, 1949, Serial No. 98,609

6 Claims. (Cl. 73—355)

This invention relates to pyrometer devices and is particularly directed to providing improvements in pyrometer devices of the type employed to measure the temperature of molten baths of slag and like high melting temperature substances.

Various types of pyrometers are well known and are widely used for measuring the temperatures of molten baths of high melting temperature substances. Such pyrometers are usually of the thermocouple type, the optical type and the radiation type of pyrometer.

The radiation pyrometer as at present developed has certain advantages over thermocouple and optical pyrometers which make it more satisfactory for continuous use over relatively long periods of time to measure the temperature below the surface of a molten bath. The radiation pyrometer comprises, in general, a tube exposed at one end to the molten bath and communicating at the other end with a radiation-sensitive device, such as a thermopile or a photovoltaic cell. This device converts the radiant energy emitted by a highly heated body into electrical energy which may be measured by a millivoltmeter or measured and recorded by a recording device such as a recording potentiometer. The tube provides an unobstructed light tunnel from the forward end to the radiation responsive cell at the rearward end. The interior of the sight tube is cooled and kept clear of obstructions to the passage of light by a current of air which passes through the tube into the molten bath, and the exterior of the tube may be cooled by water or other coolant where it extends through the furnace wall.

It is found, in the use of a radiation pyrometer to measure continuously or at brief periodic intervals the temperature of a molten bath, that it has several important disadvantages. The end of the sight tube subjected to contact with the molten bath tends to deteriorate rapidly under the intense heat and the corrosive and erosive action of the molten bath and thus requires frequent replacement. Also, this end of the tube tends to become at least partially covered by a fringe of solid bath material due to solidification resulting from the substantial difference between the temperature of the sight tube, which is usually cooled with water or air, and the temperature of the molten bath. This solid fringe at the end of the sight tube reduces the area of the molten bath exposed to the pyrometer cell and results in low, incorrect measurements. In order to obtain accurate temperature measurements, the area of molten bath exposed to the pyrometer cell must remain constant.

We have found that the above and other difficulties in obtaining accurate temperature measurements below the surface of a molten bath can be overcome by imparting a reciprocal motion to the sight tube, or the forward end thereof, at predetermined, periodic time intervals.

An important object of this invention is to provide improvements in temperature measuring devices particularly adapted for measuring the temperature of high melting temperature molten baths whereby the end of the device subjected to contact with the molten bath for the purpose of measuring the temperature thereof is actuated from a position at rest removed from the molten bath to a position exposed to the molten bath and returned to its position at rest at periodic intervals.

The pyrometer device of the present invention comprises, in general, a housing, a tube having an end adapted to be exposed to a high temperature body slidably mounted in the housing and automatically actuated means for imparting reciprocal movement to said tube at periodic intervals to advance said tube to a position in which said end extends beyond the housing and to retract the tube to a position in which said end is supported within said housing.

An understanding of the manner in which the above and other objects of the invention are attained may be had from the following description, reference being made to the accompanying drawings, in which:

Figure 1 is a sectional view illustrating a radiation pyrometer and associated parts incorporating the improvements of the present invention mounted in a tuyère of a melting furnace.

Figure 2 is a plan view of the sight tube forming part of the pyrometer assembly;

Figure 3 is a detail view in section of the nose piece.

In the preferred modification of the invention illustrated in the drawings, the numeral 9 indicates an elongated housing or casing, preferably comprised of metal, such as iron or steel, and designed to withstand relatively high temperatures without deterioration or deformation. In use, this housing 9 is carried by and extends through the wall of a melting furnace, for example, through a water-cooled tuyère indicated by the numeral 21, whereby it is cooled by the water circulating around the tuyère.

A sight tube 5 is mounted for reciprocal movement in the casing 9. The sight tube 5 extends through the casing 9 and communicates at one end with a stationary radiation sensitive device, such as a thermopile or a photo-voltaic cell, which converts the radiant energy emitted by the molten bath to electrical energy, for example, a radiation pyrometer enclosed in housing 22. The pyrometer is fixed in position and is separately supported, for example, on a floor stand and is connectable to a recording instrument such as a recording potentiometer. The other end of the sight tube terminates in a nose piece or cap indicated by the numeral 6. As the nose piece 6 is subject to deterioration over a period of time, it is preferably detachably fastened to the end of the sight tube for ready replacement. The sight tube 5 and nose piece 6 provide an unobstructed light tunnel from the interior of the furnace to the radiation sensitive pyrometer.

Air under relatively low pressure is passed through inlet 23 into air chamber 2 and air duct 24 in contact with the outer surface of the sight tube. The air passes into the sight tube through openings 25 and is discharged through the forward end of the sight tube into the furnace.

The forward end of the sight tube, which is extended through the tuyère or furnace wall, is cooled by proximity to the water-cooled tuyère 21 and by the air flowing through and around the sight tube. The essential function of the air passing through the sight tube into the furnace is to prevent the molten bath in the furnace from flowing into the sight tube. The air also helps to cool the sight tube and nose piece, and to maintain a clear, unobstructed light tunnel from the interior of the furnace to the radiation pyrometer at the rearward end of the sight tube.

The sight tube is mounted for reciprocal movement within the housing or casing 9. This reciprocal movement may be obtained by mechanical, electrical, hydraulic or pneumatic means, or a combination of these. A preferred modification, illustrated in Figure 1, employs a combination of electrical and mechanical means. In the arrangement illustrated by Figure 1, the sight tube 5 is advanced forwardly to extend the nose piece 6 a short distance beyond the forward end of the housing 9 at periodic intervals by a lever 4. The lever 4 is connected at one end to the sight tube 5 and at the other end to a push rod 26 and is supported between its ends by a bracket 3. One end of the bracket 3 is pivotally connected at 17 to a lever 4 and the other end is connected to the sight tube assembly. The push rod is actuated at timed intervals by a solenoid 27. The sight tube is returned to its retracted position by a compression spring 8. At its rearward end, the spring 8 bears against a collar 7 fixed to the sight tube 5. The lever 4 bears against the rearward side of collar 7. The forward end of the spring presses against the fixed end plate 1 fastened to the rearward end of air inlet chamber 2.

The rearward end of the sight tube 5 is closed by a glass window 10 to ensure that all air entering the inlet 23 will pass into the furnace.

A valve 11, such as a gate valve, is inserted in the sight tube in front of the glass window 10. This valve is provided to close off the sight tube to permit removal of the glass window for cleaning or replacement without affecting the flow of air into the furnace. The pressure exerted by the air entering the furnace through the sight tube assembly must at all times be greater than the back pressure of the molten bath to prevent the flow of molten bath into the sight tube. If air were allowed to escape through the rearward end of the sight tube, the molten bath would discharge from the furnace through the tube. In normal operation, the valve 11 is open, and is closed only when the glass window is removed.

As a specific modification of the invention, the pyrometer device is employed to measure continuously the temperature of a bath of molten slag in a slag fuming furnace used for the elimination of zinc from lead blast furnace slag. The temperature of the bath is of the order of 2000° F. to 2300° F., and is recorded continuously by a recording potentiometer connected to the pyrometer cell. The solenoid 27 is adjusted to move the sight tube at intervals of 10 seconds during which the sight tube is suddenly advanced to its forward position for one second and then retracted to its rest position for nine seconds. Slag tends to solidify over the forward end of the assembly and to form a fringe which would shade the area of molten bath exposed to the pyrometer cell. However, as the sight tube is advanced to its extended position, this fringe of solidified slag is broken off by the sight tube before the fringe can shade the bath area exposed to the pyrometer cell and is carried away by the turbulent bath. In this manner, the area of molten slag exposed to the pyrometer cell is kept constant, assuring accurate measurement of the temperature of the molten slag. A total movement of about one quarter of an inch is sufficient for the purpose of this modification, that is, the forward end is advanced from a position about one-eighth of an inch within the housing 9 to a position about one-eighth of an inch beyond the housing. The extent of the movement may be varied, of course, to meet specific requirements, and the timing of the movement may be adjusted to ensure that the slag fringe is dislodged before it begins to shade the area of molten slag exposed to the pyrometer cell.

The improved pyrometer device of the present invention possesses a number of important advantages. Any bath material solidifying around the front of the sight tube, thereby tending to reduce the area of molten bath exposed to the pyrometer cell, is broken away or dislodged by the nose piece when the sight tube is advanced to its forward position. The area of the bath exposed to the pyrometer cell is thus maintained constant, a condition essential to accurate continuous temperature measurement. If this area were restricted by a fringe of solid material, the reduction in area would result in erroneously low temperature recordings.

A further important advantage is the very brief period during which the forward end of the sight tube, or nose piece, is subjected to the high temperature prevailing inside the furnace. For example, if the movement of the sight tube is timed for intervals of 10 seconds, the nose piece is extended into the furnace for a period of only about one second or less, and for the remaining part of the interval, the nose piece is retracted into the housing wherein it is kept relatively cool by proximity to the water-cooled tuyère and by the air passing through and around the sight tube. This cooling prevents burning and rapid destruction of the nose piece.

It will be understood, of course, that modifications may be made in the preferred embodiment of the invention described and illustrated herein without departing from the scope of the invention as defined by the appended claims.

What we claim as new and desire to protect by Letters Patent of the United States is:

1. A pyrometer device for measuring the temperature of a high temperature body which comprises a housing, a sight tube having a forward end adapted to be exposed to a high temperature body providing a light tunnel extending from a light receiving aperture at the forward end to radiation sensitive means spaced rearwardly of said forward end slidably mounted in said housing, and automatically actuated means for imparting reciprocal movement to said tube at periodic intervals to advance said tube to a position in which said forward end extends beyond the housing and to retract the tube to a position in which said forward end is supported within the housing.

2. A pyrometer device for measuring the temperature of a molten bath which comprises a housing, a sight tube having a forward end adapted to be exposed to a high temperature body providing a light tunnel extending from the forward end to radiation sensitive means spaced rearwardly of said forward end slidably mounted in said housing, and automatically actuated means for imparting reciprocal movement to said tube at periodic intervals to advance said tube to a position in which said forward end is brought into contact with said molten bath and to retract the tube to a position in which said forward end is supported within the housing out of contact with said molten bath.

3. A pyrometer device for continuously measuring the temperature of a hot molten bath comprising a housing, a sight tube having a forward end adapted to be exposed to a high temperature body slidably mounted in said housing and providing a light tunnel from the forward end of the tube to a radiation sensitive cell positioned adjacent to the rearward end of the tube, automatically actuated means for advancing the tube at periodic intervals to a position in which the forward end extends beyond the housing in contact with said molten bath, means for retracting the tube to a position in which the forward end is supported within the housing, and means for preventing the passage of fluid through the rearward end of said sight tube.

4. A pyrometer device for continuously measuring the temperature of a hot molten bath comprising a housing, a sight tube having a forward end adapted to be exposed to a high temperature molten body slidably mounted in said housing and providing a light tunnel from the molten bath at the forward end of the sight tube to a radiation sensitive cell spaced rearwardly of said forward end, automatically actuated means for advancing at periodic intervals said tube to a position in which the forward end extends beyond the housing in contact with said molten bath, and means for retracting the tube to a position in which the said forward end is supported within said housing, means for introducing air into and around said sight tube, and valve means in said sight tube between said forward end and said cell for closing the rearward end of said sight tube against the passage of fluid.

5. A pyrometer device for measuring the temperature of a high temperature body which comprises a housing, a sight tube having a forward end adapted to be exposed to a high temperature body providing a light tunnel extending from a light receiving aperture at the forward end to temperature responsive means spaced rearwardly of said forward end slidably mounted in said housing, and automatically actuated means for imparting reciprocal movement to said tube at periodic intervals to advance said tube to a position in which said forward end extends beyond the housing and to retract the tube to a position in which said forward end is supported within the housing.

6. A pyrometer device for measuring the temperature of a high temperature body which comprises a housing, a sight tube having a forward end adapted to be exposed to a high temperature body providing a light tunnel extending from a light receiving aperture at the forward end to temperature responsive means spaced rearwardly of said forward end slidably mounted in said housing, automatically actuated lever means for advancing at periodic intervals said tube to a position in which said forward end extends beyond the housing, and spring means for retracting the tube to a position in which the said forward end is supported within said housing.

HENRY ROBERT BIANCO.
A. H. WILSON BUSBY.
R. A. GILES.

REFERENCES CITED

The following references are of record in the file of this patent:

UNITED STATES PATENTS

| Number | Name | Date |
|---|---|---|
| 890,895 | Fery | June 16, 1908 |
| 1,475,365 | Schueler et al. | Nov. 27, 1923 |
| 2,020,019 | Collins et al. | Nov. 5, 1935 |